United States Patent
Bien et al.

(10) Patent No.: US 11,318,649 B2
(45) Date of Patent: May 3, 2022

(54) INJECTION MOLDING SYSTEM FOR THE INJECTION MOLDING OF AMORPHOUS METALS

(71) Applicant: Heraeus Amloy Technologies GmbH, Hanau (DE)

(72) Inventors: Elena Bien, Hanau (DE); Hans Jurgen Wachter, Hanau (DE); Eugen Milke, Hanau (DE); Hamed Shakur Shahabi, Hanau (DE); Christian Pietsch, Hanau (DE)

(73) Assignee: Heraeus Amloy Technologies GmbH, Hanau (DE)

( * ) Notice: Subject to any disclaimer, the term of this patent is extended or adjusted under 35 U.S.C. 154(b) by 38 days.

(21) Appl. No.: 17/104,027

(22) Filed: Nov. 25, 2020

(65) Prior Publication Data

US 2021/0162641 A1 Jun. 3, 2021

(30) Foreign Application Priority Data

Nov. 29, 2019 (EP) .................................... 19 212 445

(51) Int. Cl.
*B29C 45/27* (2006.01)
*B29C 45/53* (2006.01)
*B29C 45/17* (2006.01)

(52) U.S. Cl.
CPC .......... *B29C 45/2703* (2013.01); *B29C 45/53* (2013.01); *B29C 2045/1792* (2013.01)

(58) Field of Classification Search
CPC ................ B29C 45/2703; B29C 45/53; B29C 2045/1792
See application file for complete search history.

(56) References Cited

U.S. PATENT DOCUMENTS

| | | | |
|---|---|---|---|
| 2007/0292557 A1 | 12/2007 | Dewar et al. |
| 2014/0090799 A1 | 4/2014 | Waniuk et al. |
| 2014/0360695 A1 | 12/2014 | Waniuk et al. |
| 2015/0144291 A1 | 5/2015 | Brandt et al. |
| 2015/0144292 A1 | 5/2015 | Pham et al. |

FOREIGN PATENT DOCUMENTS

| | | |
|---|---|---|
| CN | 104039480 | 9/2014 |
| DE | 30 30 263 | 2/1982 |
| DE | 10 2006 014 554 | 10/2007 |
| EP | 0 441 289 | 8/1991 |

(Continued)

*Primary Examiner* — James Sanders
(74) *Attorney, Agent, or Firm* — Dicke, Billig & Czaja, PLLC

(57) ABSTRACT

One aspect relates to an injection molding system for the injection molding of amorphous metals, an injection molding unit for the injection molding of amorphous metals and an injection molding process for amorphous metals.

The injection molding system includes a channel for feeding a molten metal and a slider unit including a slider and a pressure system. The slider is located between the channel and at least one injection molding cavity and is movable between a rest position and an injection position. In the rest position, the slider blocks the access of the molten metal to the injection molding cavity and in the injection position it allows the molten metal to access the injection molding cavity. The pressure system holds the slider in the rest position and allows the slider to move to the injection position when a minimum pressure is exceeded.

12 Claims, 2 Drawing Sheets

(56) References Cited

FOREIGN PATENT DOCUMENTS

| | | |
|---|---|---|
| JP | S5941239 | 3/1984 |
| JP | H01210322 | 8/1989 |
| JP | H07-268597 | 10/1995 |
| JP | 2009269073 | 11/2009 |
| KR | 2016-0086993 | 7/2016 |
| WO | 2017/066951 | 4/2017 |
| WO | 2018/119509 | 7/2018 |

INJECTION MOLDING SYSTEM FOR THE INJECTION MOLDING OF AMORPHOUS METALS

CROSS-REFERENCE TO RELATED APPLICATION

This Utility Patent Application claims priority to European Application No. 19 212 445.1 filed on Nov. 29, 2019, which is incorporated herein by reference.

TECHNICAL FIELD

One aspect relates to an injection molding system for the injection molding of amorphous metals, an injection molding unit for the injection molding of amorphous metals and an injection molding process for amorphous metals. The injection molding system, injection molding unit and injection molding process can of course also be used for other types of metals or metal composites

BACKGROUND

One speaks of amorphous metals when metal alloys do not have a crystalline but an amorphous structure at the atomic level. Usually such a disordered structure is achieved by rapid cooling of a melt. "Rapid cooling" means that the atoms or molecules can no longer arrange themselves regularly when cooling down.

In the injection molding of metals and especially amorphous metals, a certain amount of material is added, heated in a melting chamber, melted and then injected, i.e. usually pressed into an injection mold with a piston.

Due to the location of the melting chamber or the melting process, the melted material must first travel a certain distance before it reaches the injection mold or the cavity(ies). The injection process starts as soon as the raw material is completely melted. This can lead to the so-called forward running: the parts of the liquefied material that are closer to the mold in the melting chamber enter the mold earlier.

Due to the forward running of the melt into the cavity, the melt cools down too quickly at the forward running point and thus prevents complete filling of the cavity with the melt and/or filling with sufficient temperature to ensure amorphous cooling in particular. A further problem is posed by the converging point of rotating (for example, ring-shaped) parts, as this area often does not become hot enough and a connection between the melt fronts is then impaired. Flow lines, reduced durability and breakage can then occur at the converging point. Devices and processes for injection molding of amorphous metals in particular can therefore be further improved.

SUMMARY

One embodiment provides an improved injection molding system for the injection molding of metals, which is particularly suitable for the injection molding of amorphous metals.

One embodiment is achieved by an injection molding system for the injection molding of amorphous metals according to the independent claims. Advantageous embodiments and further features are to be taken from the sub-claims and the following description.

BRIEF DESCRIPTION OF THE DRAWINGS

Further features, advantages and possible applications of the present embodiment result from the following description, the embodiment examples and the figures. All described and/or pictorially depicted features can be combined with each other in individual claims, figures, sentences or paragraphs, regardless of their representation. In the figures the same reference signs stand for the same or similar embodiments.

DETAILED DESCRIPTION

Figure 1:
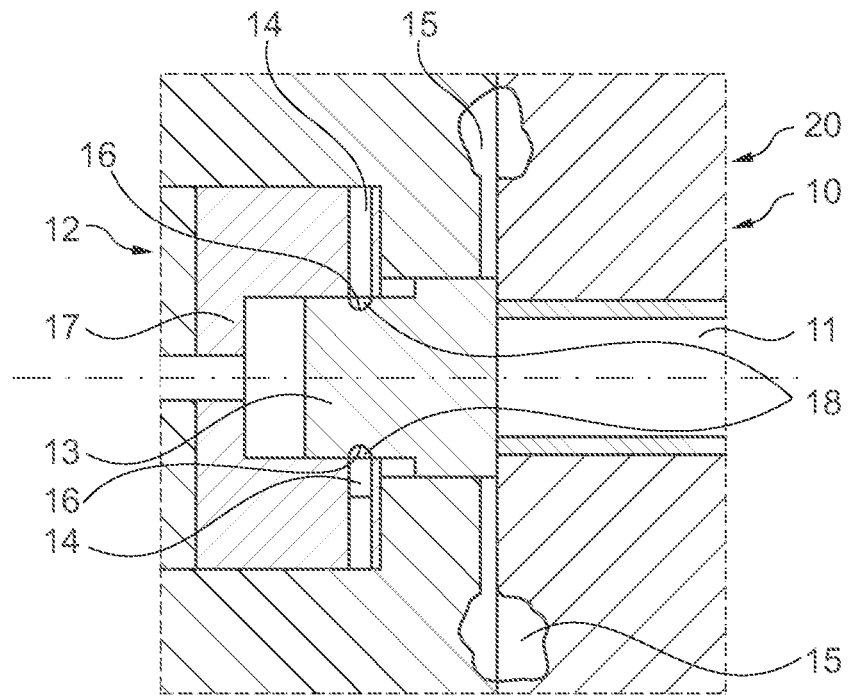
FIG. 1 illustrates a schematic cross-section of an injection molding unit with an injection molding system for the injection molding of amorphous metals according to one embodiment in a rest position.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

One embodiment includes an injection molding system for the injection molding of amorphous metals. The injection molding system includes a channel for feeding a molten metal and a slider unit including a slider and a pressure system. The slider is located between the channel and at least one injection molding cavity and is movable between a rest position and an injection position. In the rest position, the slider blocks the access of the molten metal to the injection molding cavity and in the injection position it allows the molten metal to access the injection molding cavity. The pressure system holds the slider in the rest position and allows the slider to move to the injection position when a minimum pressure is exceeded.

The slider and pressure system can thus form a pressure-controlled injection slider that keeps the path into one or more injection molding cavities closed until a preset pressure limit is reached, and then the gate opens abruptly, thereby opening the path into the injection cavity(ies) of the mold. The injection molding cavity can be a component or just a layer on a component.

With the present injection molding system, an uneven injection can be prevented or at least reduced. In one embodiment, an uneven forward running into the injection molding cavity(ies) can be prevented or reduced. In this way, incomplete filling of the injection molding cavity(ies) and/or filling at suboptimal temperature is prevented or reduced, which allows or at least facilitates cooling at a sufficient cooling rate of the injected metal to achieve amorphous properties. Furthermore, the production of circumferential or ring-shaped components is facilitated, as it is easier to connect the melt fronts at the converging point, which improves the durability of the component.

The present injection molding system also allows the use of lower injection speeds or piston speeds and thus permits lower material wear. The present injection molding system improves the injection itself and thus allows the use of several injection cavities, which reduces production costs. The improved injection process also enables the production of elongated and/or thin components.

The minimum pressure can be a predefined pressure of the molten metal on the slider. The minimum pressure can also be a predefined injection pressure of the molten metal into the channel.

In one embodiment, a pressure direction of the slider is essentially parallel to a direction of flow of the molten metal.

In one embodiment, the pressure system includes a plurality of pressure rods that are movable between a holding position and a release position. In the holding position, the pressure rods engage an outer edge of the slider and hold the slider in the rest position. In the release position, the pressure rods release the outer edge of the slider and allow the slider to move into the injection position.

In one embodiment, the slider has a large number of notches or grooves arranged along the outer edge of the slider. One of the indentations is designed to accommodate one of the pressure rods each.

In one embodiment, the pressure rods have balls at their ends facing the slider. In other words, at least some of the compression bars may have a ball or a roller at their free ends. By using the pressure rods with balls, force can only be absorbed axially when the pressure rods engage or snap into the slider. In this way, the relatively low force of the ejector is sufficient to push the slider back into its rest position after use, in which the pressure rods engage in the slider again.

In one embodiment, the pressure rods are pretensioned in the direction of the slider. In their holding position, the pressure rods engage with the slider and hold it in its rest position. When the minimum pressure of the molten metal is exceeded, the pretension is overcome so that the pressure rods change to the release position and release the slider, which then changes to its injection position.

The slider can be located opposite the channel or an injection chamber. The slider can be guided directly in the mold or in an insert. In one embodiment, the injection molding system also includes a sleeve in which the pressure rods are mounted. The sleeve can grip around the slider in a U-shape or ring shape. The pressure rods can be arranged at one end of the sleeve. The injection molding system can include 10 to 20 pressure rods, but of course other quantities are also possible. For example, 16 pressure rods can be arranged in a sleeve, in one embodiment distributed in two staggered circles along a circumference of the sleeve. The pressure rods engage in the slider. If the pre-defined minimum pressure is applied or exceeded, the pressure rods can move radially outwards and the slider can abruptly move backwards. An ejector for the injection-molded component can run through the sleeve.

In one embodiment, the numerous pressure rods are arranged in a row along an outer edge of the slider. In another embodiment, the numerous pressure rods are arranged in two or more rows along an outer edge of the slider. The two or more rows of pressure rods are then spaced apart or offset from each other. So they form rings that do not cut each other. In other words, in one embodiment, the several rows of pressure rods are arranged in a ring shape next to each other on the outer edge of the slider. In another embodiment, the several rows of pressure rods spiral around the outer edge of the slider. In this case, the pressure rods form a track that winds or is wound around the slider.

In one embodiment, the pressure system includes a spring, a hydraulic, a pneumatic, an electric motor or a similar device which holds the slider in the rest position and, when the minimum pressure is exceeded, releases the slider to move into the injection position.

In one embodiment, the pressure system includes at least one clamp that holds the slider in the rest position and releases the slider to move to the injection position when the minimum pressure is exceeded.

In one embodiment, the pressure system includes at least one magnet which holds the slider in the rest position and, when the minimum pressure is exceeded, releases the slider to move into the injection position.

The above mentioned embodiments of the pressure system can also be mounted in the sleeve.

In one embodiment, the injection molding system also includes a piston for pushing the molten metal through the channel. It is also possible to couple the slider to the position of the piston.

One embodiment further includes an injection molding unit for the injection molding of amorphous metals. The injection molding unit includes an injection molding system, as described above, and at least one injection molding cavity. The injection molding system includes a channel for feeding a molten metal and a slider unit, a slider of the slider unit being arranged between the channel and the injection molding cavity.

In one embodiment, the injection molding unit includes several injection molding cavities, wherein the slider blocks the access of the molten metal to the injection molding cavities in a rest position and allows the molten metal to access the injection molding cavities in an injection position. In one embodiment, the injection molding unit includes three to five and in one embodiment four injection molding cavities.

One embodiment further includes an injection molding process for amorphous metals including the following processes, not necessarily in that order feeding a molten metal through a channel, blocking of the molten metal by a slider unit. The slider unit includes a slider and a pressure system. The slider is located between the channel and at least one injection molding cavity and is movable between a rest position and an injection position. In the rest position, the slider blocks the access of the molten metal to the injection molding cavity. The pressure system holds the slider in the rest position.

release of the molten metal by the slider unit, in which the pressure system changes from the rest position to the release position when a minimum pressure is exceeded. This allows the slider to move into the injection position when a minimum pressure is exceeded.

There are several possibilities to move the slider back to the holding position, among others by using hydraulics, pneumatics, electric motor, manual etc. In one embodiment, the injection molding unit also includes a return of the slider to the rest position together with an ejection of an injection-molded workpiece. To do this, an ejector runs in such a way that it simultaneously (in one movement) ejects the workpiece and presses the slider back into the holding position. This is achieved in one embodiment by the fact that the slider according to the present embodiment is so light and easy to move.

In one embodiment, the feeding of the molten metal through the channel is carried out at speeds of at least 100 mm/s or maximum 1000 mm/s or at speeds between 100 m/s and 1000 m/s or in one embodiment at speeds between 300 m/s and 700 m/s or in one embodiment at speeds between 400 m/s and 600 m/s.

In one embodiment, the molten metal is fed into the cavity(s) at a pressure of 50 or 60 bar or more, in one embodiment between 500 and 3000 bar, and further in one embodiment between 1000 and 2000 bar. The pressure can be built up by using the piston, but this is not absolutely necessary.

In one embodiment, a possible injection length or injection depth is 3 to 15 cm. The injection length describes the longest distance from the injection point to the end of the component.

Figure 2:
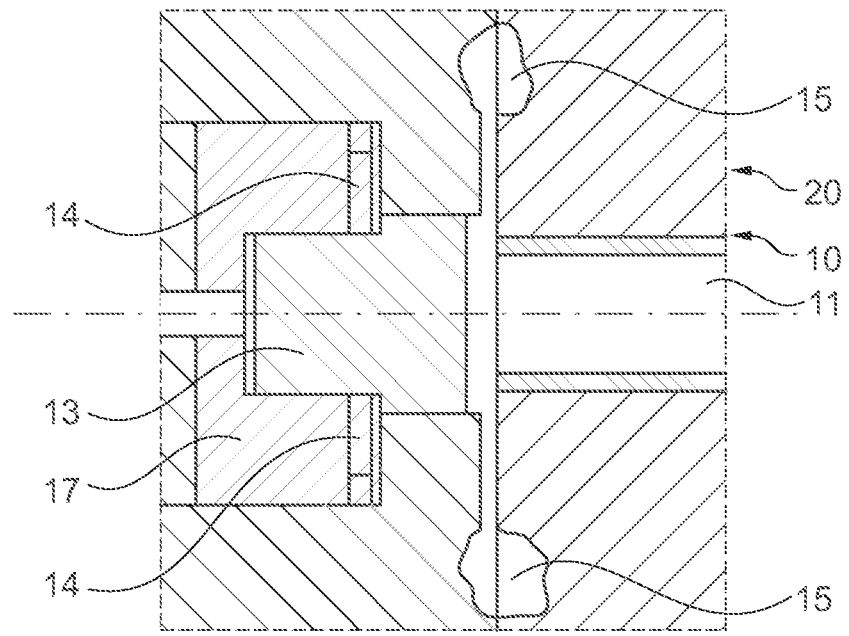
FIG. 2 illustrates a schematic cross-section of an injection molding unit with an injection system for the injection molding of amorphous metals according to one embodiment mold in an injection position.

FIGS. 1 and 2 each show an injection molding unit 20 for the injection molding of amorphous metals. The injection molding unit 20 includes an injection molding system 10 and several injection molding cavities 15. The injection molding system 10 includes a channel 11 for feeding a molten metal and a slider unit 12, a slider 13 of the slider unit 12 being arranged between the channel 11 and the injection molding cavities 15. The pressure direction of the slider 13 is parallel but opposite to a direction of flow of the molten metal 30. FIG. 1 illustrates the injection molding unit 20 in a closed state of the pressure controlled slider 13. FIG. 2 illustrates the injection molding unit 20 in an open state of the pressure controlled slider 13.

The slider unit 12 includes the slider 13, which is located opposite the channel 11 or an injection chamber. The slider 13 is located between the channel 11 and the injection molding cavities 15. It can be moved between a rest position (see FIG. 1) and an injection position (see FIG. 2). In the rest position (see FIG. 1), the slider 13 blocks the access of the molten metal to the injection molding cavities 15, and in the injection position (see FIG. 2) it allows the molten metal to access the injection molding cavities 15.

The slider unit 12 includes a pressure system in the form of a number of pressure rods 14, which are arranged on the slider 13 and are movable between a holding position (see FIG. 1) and a release position (see FIG. 2). In the holding position (see FIG. 1) the pressure rods 14 hold the slider 13 in the rest position and in the release position (see FIG. 2) they allow the slider 13 to be moved into the injection position. The pressure rods 14 change from the holding position (see FIG. 1) to the release position (see FIG. 2) when a minimum pressure of molten metal on the slider 13 is exceeded. The pressure rods 14 are arranged in a row along an outer edge of the slider 13, here only two are visible.

The slider 13 and the pressure rods 14 form a pressure-controlled injection slider which keeps the path into the injection molding cavities 15 closed until a preset pressure limit (pressure of the molten metal 30 on the slider 13 or injection pressure of the molten metal 30 into the channel) is reached, and the slider 13 opens abruptly, thus opening the path into the injection molding cavities 15 of the injection mold.

The injection molding system 10 also includes a sleeve 17 in which the pressure rods 14 are mounted. The sleeve 17 grips around the slider 13 U-shaped. The pressure rods 14 are arranged at the free ends of the sleeve 17. The pressure rods 14 engage in the slider 13. If the predefined minimum pressure is applied or exceeded, the pressure rods 14 can move radially outwards and the slider 13 can move abruptly backwards. An ejector for the injection-molded part runs through sleeve 17.

The pressure rods 14 have balls 18 at their ends facing the slider 13. By using the pressure rods 14 with balls 18, axial force can only be absorbed when the pressure rods 14 engage or snap into the slider 13. In this way, the relatively low force of the ejector is sufficient to push the slider 13 back into its rest position after its use, in which the pressure rods 14 again engage in the slider 13.

The slider 13 has a number of notches 16, which are arranged along an outer edge of the slider 13. One of the notches 16 is designed to accept one of the pressure rods 14 with balls 18.

Figure 3A:
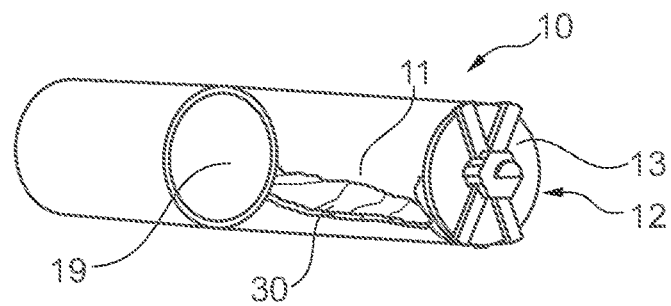
FIGS. 3a-d schematically illustrates an injection molding process for amorphous metals.
Figure 3B:
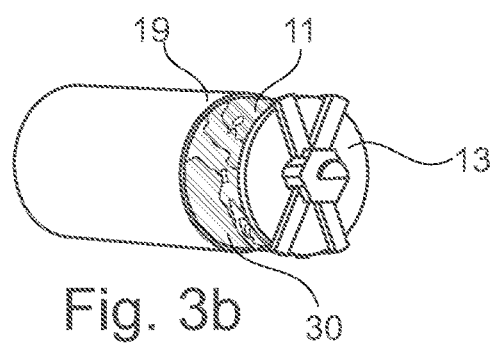
Figure 3C:
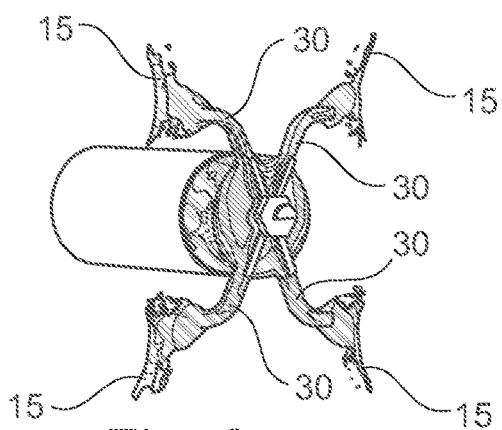
Figure 3D:
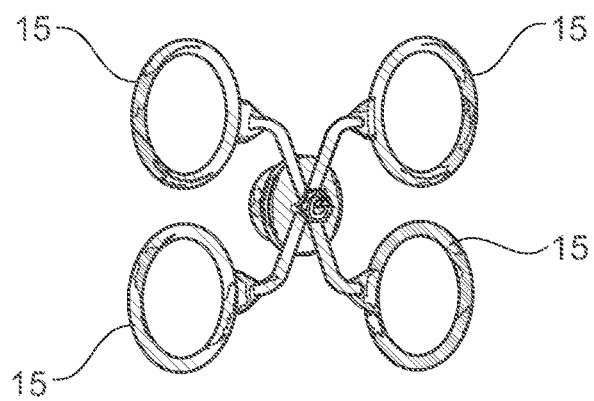

FIG. 3 schematically illustrates the flow of a melt into the cavity(ies) and allows the explanation of the present injection molding process for amorphous metals. The injection molding process may include the following processes, not necessarily in that order:

feeding a molten metal 30 through a channel 11 (see FIG. 3a).

blocking of the molten metal 30 by a slider unit 12 (see FIGS. 3a and 3b). The slider unit 12 includes a slider 13, which is located between the channel 11 and the injection cavities 15 and can be moved between a rest position and an injection position. In the rest position shown in FIGS. 3a and 3b, slider 13 blocks the access of molten metal 30 to the four annular injection molding cavities 15. In other words, slider 13 is closed and pressure is built up.

release of the molten metal 30 by the slider unit 12 (see FIG. 3c), in which the slider 13 opens the slider 13 when a minimum pressure is exceeded. The slider 13 changes to its injection position, which allows the molten metal 30 to access the injection cavities 15. The injection process into the injection molding cavities 15 begins. In FIG. 3d, the injection process is completed and injection cavities 15 are filled.

In addition, it should be noted that 'including' and 'having' does not exclude any other elements or processes. It should also be noted that features or processes described with reference to one of the above embodiment examples can also be used in combination with other features or processes of other embodiment examples described above. Reference marks in the claims are not to be regarded as a restriction.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. An injection molding system for injection molding of amorphous metals, comprising:

a channel for feeding a molten metal, and a slider unit comprising a slider and a pressure system, wherein the slider is arranged between the channel and at least one injection molding cavity;

wherein the slider is movable between a rest position and an injection position, wherein the slider in the rest position blocks access of the molten metal to the injection molding cavity and in the injection position allows access of the molten metal to the injection molding cavity, and wherein the pressure system holds the slider in the rest position and, when a minimum pressure is exceeded, allows the slider to move into the injection position, and wherein the pressure system comprising a plurality of pressure rods movable between a holding position and a release position, wherein the pressure rods in the holding position engage an outer edge of the slider and hold the slider in the rest position and in the release position release the outer edge of the slider and allow movement of the slider to the injection position.

2. The injection molding system according to claim 1, wherein the minimum pressure is a predefined pressure of the molten metal on the slider or a predefined injection pressure of the molten metal into the channel.

3. The injection molding system according to claim 1, wherein the slider has a plurality of notches arranged along the outer edge of the slider, and each of the notches is designed to receive a respective one of the pressure rods.

4. The injection molding system according to claim 1, wherein the sliding unit further comprises a sleeve in which the pressure rods are mounted.

5. The injection molding system according to claim 1, wherein the pressure rods have balls at their ends facing the slider.

6. The injection molding system according to claim 1, wherein the pressure system comprises a spring, a hydraulic, a pneumatic or an electric motor which holds the slider in the rest position and, when the minimum pressure is exceeded, releases the slider for movement into the injection position.

7. The injection molding system according to claim 1, wherein the pressure system comprises at least one clamp which holds the slider in the rest position and releases the slider for movement to the injection position when the minimum pressure is exceeded.

8. The injection molding system according to claim 1, wherein the pressure system comprises at least one magnet which holds the slider in the rest position and, when the minimum pressure is exceeded, releases the slider for movement to the injection position.

9. The injection molding system according to claim 1, wherein a pressure direction of the slider is essentially parallel to a flow direction of the molten metal.

10. The injection molding system according to claim 1, further comprising a piston for pushing the molten metal through the channel.

11. An injection molding unit for injection molding of amorphous metals, comprising:
    an injection molding system according to one of the previous claims, and
    at least one injection molding cavity,
wherein the injection molding system comprises a channel for feeding a molten metal and a slider unit, and wherein a slider of the slider unit is arranged between the channel and the injection molding cavity.

12. The injection molding unit according to claim 11, wherein the injection molding unit comprises several injection molding cavities, preferably four injection molding cavities, and wherein the slider in a rest position blocks the access of the molten metal to the injection molding cavities and in an injection position enables the access of the molten metal to the injection molding cavities.

* * * * *